Patented Mar. 20, 1945

2,371,868

UNITED STATES PATENT OFFICE 2,371,868

POROUS POLYVINYL CHLORIDE COMPOSITIONS

Herbert Berg and Martin Doriat, Burghausen, Germany; vested in the Alien Property Custodian No Drawing. Application February 5, 1942, Serial No. 429,652. In Germany September 9, 1940

4 Claims. (Cl. 260—36)

This invention relates to the production of porous polyvinyl-chloride compositions containing plasticizers.

It is known to produce porous compositions of polyvinyl compounds for example polystyrol or polyvinyl-chloride. In this process a mixture of a polyvinyl compound and a gas-producing substance is heated under a rapidly rising vacuum. The gas-producing substances employed, however, deteriorate the properties of the end products; besides there cannot be obtained a fine and homogeneous porosity by the rapidly rising vacuum. Therefore, products of this kind have not been used in the arts.

Besides, it is known to produce porous compositions of polymethacrylic acid esters by sintering these substances without softening agents in the form of powders or granules by heating them under a mild pressure or by softening them by employing solvents and then combining them under pressure. Since in the last and more important process real solvents are used, it was necessary to decrease their undesired dissolving capacity by various measures for example by employing solvents already containing important quantities of dissolved substance including the artificial resin starting material, or by employing the solvent in the form of gas or vapor in order to avoid excessive swelling of the granules of the artificial resin. Also solvents were recommended which have a dissolving power on the surface of the grains only at the temperature of their boiling point.

Now it has been found that granules of polyvinyl chloride can be combined excellently, whereby even preferably higher binding temperatures can be applied without endangering porosity, if no solvents or swelling agents are employed in order to facilitate a strong binding but instead only real plasticizers are used which previously have been mixed with the thermoplastic material.

Surprisingly, the use of plasticizers, facilitating the sintering, is not only possible but even large amounts of plasticizers which can be more than 100 per cent, calculated upon the polyvinyl chloride, can be employed. This is extraordinarily surprising because one had to expect a non-porous or at least an imperfectly porous substance if larger amounts of plasticizers are employed. The plasticizers not only facilitate the sintering process but it is also most important that by this way plasticizer-containing porous substances of desired softness and flexibility can be obtained, containing the plasticizer in finest dispersion. This fact is very important for many uses.

In practising this invention, the powdery or granular substances are treated in a mixing apparatus with plasticizers or a mixture of plasticizers and volatile solvents which do not solve the polyvinyl chloride or dissolve it only to a small degree at temperatures below the sintering temperature, until the particles of the powder or granules have absorbed the added plasticizers or the mixture of plasticizers and solvents completely or at least for the most part; then this composition is sintered at a suitable high temperature. The sintering is modified in a remarkable manner by the application of the plasticizers or the mixtures of plasticizers and solvents. It may also be advantageous to employ mixtures of certain plasticizers and volatile solvents.

If the sintering is carried out on a free, for example, plane support or in a form which allows expansion, the powdery or granular substances rise and occupy a larger volume. Hereby specially light and loose porous masses are obtained. They facilitate for instance the tearing into flocks for the filling of insulating spaces.

Generally one will work against such an expansion and loosening of the structure. This can be done for instance during the production of porous foils and plates by such a way, that the powder and the like containing plasticizers is not freely arranged in layers on the support but by putting a framing on the support which is completely filled up by the powder and by laying a cover on the framing. This prevents the rising of the mass if it is heated. On the other hand the tendency of the mass to rise gives a sufficient pressure against the cover to form a porous plate. It is useful to utilize the covering surface and likewise the support as a heating surface. In order to produce complicated porous molded articles corresponding molds are used which are covered at the filling opening and, if necessary, can also be heated at the side walls.

A specially solid structure and a desired small degree of porosity, especially a microporous structure is obtained by pressing the mass by means of a suitably heated stamp or the like during the heating.

Other modifying measures consist in carrying out the sintering in a closed mold and causing in it an over-pressure with the aid of a gas during the heating or an underpressure by vacuum. These measures are the more effective the more vacuoles are formed beside the open pores which depends as well on the grade of polyvinyl chloride used, on the addition of plasticizers or mixtures of plasticizers and solvents, and the conditions of the heating (temperature and duration) and the pressure as executed by a stamp or by a preceding stamping.

In certain cases it may also be advantageous to carry out the sintering in an indifferent or chemically active atmosphere, for instance in an oxidizing, reducing, vulcanizing or chlorinating atmosphere.

Generally the sintering takes place the easier the more softeners or mixtures of plasticizers and solvents are contained in the powder and the like.

By the fact that the sintering proceeds the more rapidly and completely the more plasticizer or mixtures of plasticizers and solvents are contained in the powder, the possibility is given to obtain molded articles which are partly porous, partly dense. Thus such a plate is produced if a bottom layer consisting of a powder containing a large amount of plasticizer is filled in a frame, a powder containing essentially less plasticizer is piled on it and the heat treatment is so regulated that the upper layer becomes porous, while the under layer melts together tightly.

The sintering according to this invention proceeds surprisingly so easily that it may also be carried out in situ on any surface which is to be provided with a porous covering of polyvinyl chloride. For this purpose the polyvinyl chloride is brought into a brushable state. It is worked up with an adequate excess of a plasticizer or a mixture of plasticizers and solvents. These agents must be of such a kind as to dissolve the polyvinyl chloride only slightly at temperatures under the sintering point. The polyvinyl chloride may also be worked up with a liquid which does not promote the sintering and does not dissolve, such as water or benzine, or with a binding agent, such as an adhesive solution with a volatile solvent or with a mixture of additions which cause the brushability. The thus obtained mass is brushed or smoothed on the surface to be covered, the volatile constituents are allowed to evaporate more or less; then the so obtained coating which can be suitably thickened by repeated charging is treated in situ by an instrument brought up to a suitable temperature, e. g. an iron, or a heated spatula or the like, under a suitable pressure until it is in the desired porous state.

If necessary, the added plasticizers or solvents or other liquids and binding agents may be partly extracted in the above described manner and thereby the obtained porous coatings can be hardened.

The selection of the plasticizers and solvents suitable for the sintering depends on the specific properties of the polyvinyl chloride which is to be worked up into porous masses. The selection can be made by a few simple solubility determinations at the temperature of the sintering point and under it, primarily at room temperature and, if necessary, at still lower temperatures. Generally the number of the suitable agents is larger for the higher molecular weight polyvinyl chlorides. For example for especially high molecular weight polyvinyl chloride as it can be obtained for instance according to the French Patent 837,233, all usual plasticizers also in admixture with nearly all volatile solvents are suitable with exception of the ketones, the aromatic chlorine hydrocarbons such as chlorotoluene and a few special solvents such as tetrahydrofurane.

To the powders containing plasticizers additions may also be incorporated—preferably dissolved in the sintering liquids—which influence the properties of the artificial material during or after the sintering. For this purpose stabilizers come into consideration such as lead salts, especially lead stearate, or kaolin, also additions which cause a cross-binding action upon the molecules such as vinyl crotonate according to the copending United States patent application by W. O. Herrmann and W. Haehnel, Serial No. 374,298, filed Jan. 13, 1941.

If the porous mass is to be brought in a flocky state the incorporation of gas-generating substances, such as ammonium bicarbonate, in the powder which is to be sintered may be advantageous. For this purpose the gas producing substances are preferably not incorporated in solutions but they are added to the powder of polyvinyl chloride in a solid state and in a relatively coarse distribution in order to obtain flocks of the desired size by the separating effect of the gas-generating substances.

In most cases the mixing of the powder of polyvinyl chloride and plasticizers or mixtures of plasticizers and solvents need not be carried out at a low temperature if the ingredients have been properly selected; the absorption can be accelerated by heating in most cases. Thus a high molecular weight polyvinyl chloride with an equal part by weight of tricresyl phosphate can be mixed with the methylglycol phthalate obtainable under the trade-mark "Palatinol O," dibutyl phthalate ("Palatinol C") and the like, at about 70–100° C. without destroying the powder form. In the particular case the upper temperature limit for the mixing depends on the mutual relations of solubility, if volatile solvents are employed it depends naturally also on their boiling point.

Suitable sintering temperatures for powder of equal parts of high molecular weight polyvinyl chloride and plasticizers lie for instance at about 175° C. if methylglycol phthalate is used, at about 150° C. if dibutyl phthalate is used, at about 130–140° C. if dihydroisophorolacetate is applied. Usually the sintering temperature can be lowered more by additions of volatile solvents than by a sole incorporation of non-volatile plasticizers.

Suitable heating times for the mentioned mixtures lie at about 30 minutes, if microporous plates of 10 mm. thickness are to be produced, at about 15 minutes for plates of a thickness of 5 mm., and at about 10 minutes for plates of a thickness of 3 mm. The heating can materially be shortened by preheating the powders to be sintered. That is specially recommended if thicker articles are to be produced.

The size of the pores which are formed by the sintering can be influenced by a suitable selection of the size of the grains of the polyvinyl chloride, by the amount of plasticizers or mixtures of plasticizers and solvents, by the compression of the mass with the aid of a stamp and by the combination of these measures with corresponding sintering temperatures and heating times, likewise also by applying under pressure or by increased gas pressure in the sintering mold.

If necessary, the produced microporous or coarse porous objects can be improved by a thermal after-treatment. Thereby temperatures are suitable which are close to but below the flowing point of the compositions. If volatile solvents are also employed in the production of the porous objects, the removal of them is advantageously combined with the thermal improvement, carrying it out in a vacuum or in a current of gas.

If more softeners are employed for the facilitating of the sintering process than required for the desired properties of the end products they can partly be removed by subsequent extraction. A subsequent, if necessary partial exchange of the original softeners for new ones is also possible.

Example 1

200 parts by weight of a powder of high molecular weight polymeric polyvinyl chloride which was sifted through a 200 mesh sieve was mixed with 200 parts by weight of tricresylphosphate at 100° in a mixing apparatus. The thus obtained mixture which had preserved its powdery state was filled in an iron frame which was put on a heating plate. The completely filled frame was then covered by an iron plate in order to prevent an escaping of the mass when it was heated. By heating up on 170° C. the powdery mass was sintered within 10 minutes and yielded a completely uniform microporous flexible plate of a thickness of 5 mm., of excellent properties of resistance. A stream of air or liquid can be easily blown through the plate, therefore the plate can be used as a filter and the like.

Example 2

In the same way as in Example 1 a powder of high molecular weight polymeric polyvinyl chloride consisting of particles of 75 mesh size was worked up. A relatively coarse porous but likewise excellent solid filter plate was obtained.

Example 3

200 g. of a coarse granular mixed polymerisate of the composition of 80 per cent of vinyl chloride and 20 per cent of vinyl acetate was thoroughly mixed with 80 g. of tricresylphosphate at room temperature and sintered at 80° C. under a slight pressure for ten minutes. A soft rubberlike, coarse porous plate was obtained.

The porous polyvinyl chloride compositions produced according to this invention have an excellent resistance to tearing which is superior to that of porous rubber articles. The known properties of compact polyvinyl chloride could not give any hint of this superiority. On the contrary a lower strength must be expected by the fact that the pores are open. This can only be explained by the surprising fact that the sintered spots of the parts of the polyvinyl chloride are even stronger than the original mass.

The resistance to temperature of the porous polyvinyl chloride compositions is also excellent. Thus tubes of compact polyvinyl chloride are extruded through a nozzle at a temperature of 150° C. Soiled filters of porous polyvinyl chloride, however, can be boiled out in glycerin at a temperature of 210-220° and still keep their structure and properties. The articles are even stronger after the boiling process.

The following valuable properties are also surprising: plates and blocks of the porous polyvinyl chloride compositions can be split into foils of a thickness of a few tenths of one millimeter by the known leather splitting machine on account of their surprising strength. On the other hand these blocks and plates can be divided into elastic splinters or a porous wool by countersinking, stamping, turning on a lathe, planing and the like or they may be worked up to flocks by tearing machines.

Further the ability to be welded is so surprisingly good that it is sufficient to weld the molded articles which are to be combined only at their borders. Thereby it is possible to produce complicated composite articles of polyvinyl chloride which are completely porous.

A further advantage of the porous polyvinyl chloride compositions lies in the fact that they may be formed so as to have particular layers which have different degrees of porosity, varying from a high degree of porosity to no porosity at all. It is possible to carry out the sintering in an exterior zone till the pores are completely closed, in other zones, however, only so far as open pores are formed; this is done by piling up layers of powder which sinter differently and by the application of suitable temperatures and pressures. For instance filtering cloths may be produced which are dense at their edges or at the fixing spots the main planes of which, however, are porous.

A further property of the polyvinyl chloride is that it can be brought into a porous state in situ on surfaces to be coated. If a plane support is to be coated the powder need only be piled on it and be ironed or calendered by a heated spatula or an iron and the like at a suitable pressure. If vertical or complicatedly formed surfaces are to be coated the powder is mixed with more liquid than it can absorb, if necessary also by employing binding materials. Then the paste is spread or smoothed on the surface to be coated. Hereafter the desired porous form may be obtained by ironing and the like; if necessary the mass can be previously dried or thickened by repeated spreading.

The porous polyvinyl chloride compositions can also be dyed much more homogeneously than other artificial materials, especially rubber articles. The superiority in this respect is very important for many applications.

Besides these mentioned advantages there exist also the known valuable properties of the polyvinyl chlorides, especially the high molecular weight grades: they are highly resistant to most of the organic liquids, to concentrated acids, hydrogen peroxide, persulphate, halogens, alkalies, and other strongly corroding agents, even at high temperatures. They have a high insulating power and they are nonflammable and insensitive against the action of the sun, the air, moisture and aging.

By the combination of the new and known properties many new kinds of applications have become possible. This combination makes the polyvinyl chloride superior to all other porous masses known till now; this superiority refers especially to the compositions with the high and highest molecular weight polyvinyl chlorides. It occurs in all the applications of known porous masses. Further all those applications are possible in which the known porous masses could not be applied till now.

First the porous polyvinyl chloride compositions including the articles, flocks, splinters, wools and the like formed of them enlarge and improve the technical possibilities of the thermal, electric, and acoustic insulation in the arts, for building purposes, in the household, and for clothing purposes. The high resistance to temperature in connection with the extraordinary chemical strength and the excellent mechanical properties make them ideal insulating materials, especially for the purposes of the chemical industry. Since they can be produced with extraordinary fine porosity they are of a high value for heat insulations because they prevent any convection currents in the pores. The open pores of these porous articles do not hinder their application for cold insulating purposes because the open pores of the surface of foils and plates of polyvinyl chloride can be closed, as above described, so that no moisture can enter the inside pores and a formation of ice is not possible. Thereby the above described possibility to produce porous coatings in situ is also of a high value in many cases. If necessary, the outward openings of the pores may be closed by a suitable thermal aftertreatment, for instance by heating with a flame. On the other hand the division of the produced porous masses into flocks and elastic splinters and into insulating wools, as above described, which do not set after being slightly pressed or even if they are shaken for a long time, is often of great importance for the filling of insulating hollow spaces.

The new porous compositions are also important for building purposes as for the heat insulation of floors, walls, and ceilings, especially if they have surfaces with closed pores. The ability to produce the coatings of floors, walls, and ceilings in situ, as on plaster floors, is especially advantageous. Besides the open porous coverings of polyvinyl chloride are also an excellent covering for moist walls or floors, if necessary for a support of tapestries, of coverings of linoleum and the like. Hereby, the ability of the porous polyvinyl chloride compositions to act sound insulating is very advantageous. Even foils of porous polyvinyl chloride can be obtained for floor coverings which have the effect of thick carpets on account of their excellent elasticity. The fact that polyvinyl chlorides can be dyed with much more different color tones than porous articles of rubber, and the like, and that it is odorless is specially important for these purposes.

All these advantageous properties can also be used for household articles, as for stands, floor mats, rugs for bath-rooms, pads, and the like.

The new porous polyvinyl chloride compositions can also be applied for clothing purposes. The cleavability into thin foils makes it possible to produce feltlike skinlike linings of suitable graduated porosity and flexibility and of a high heat insulating power. They can be applied as a substitute for the linings of fur but also for clothes as for warming caps, gloves, jackets, and the like. If necessary, they may be made waterproof, or waterrepelling by sucking through solutions of waterrepelling substances, as benzine, whereby their porosity is preserved. So it is possible to produce warm, light water-proof cloaks, caps, and the like, letting through the transpiration but which have also a high resistance to nearly all corroding agents and are unusually washable.

The application of all these advantages for electric insulation is obvious. The ability to produce porous coatings of polyvinyl chloride in situ is also of high importance. Thus windings of transformers can advantageously be coated in situ by such porous coverings in which insulating oil is then sucked in.

The new porous or microporous polyvinyl chloride compositions are also excellently suitable for the production of filters, such as dust filters, especially for the filtration of acid, chlorinating or oxidizing gases, for filter presses for large or small apparatus, for the filtration of drinking water, and the like, filter candles, diaphragms, for accumulators, electrolytic or osmotic cells, and the like. Their chemical and mechanical properties of resistance in connection with the above described advantages not known till now make them superior to all porous organic industrial material such as caoutchouc and the like which hitherto had been applied for such purposes. For example there are many more possibilities of cleaning soiled filters and the like: the filters of polyvinyl chloride may be boiled out in solvents such as glycerin at temperatures up to 210–220° C. In most cases it is still more suitable to boil them out with constantly boiling hydrochloric acid of 20%. Surprisingly the strength of the filters is still more increased by the boiling. While the filters, diaphragms, and the like are insensitive to nearly all strongly corroding agents and to nearly all solvents, the porous polyvinyl chloride compositions can be removed if necessary from spots in apparatus which are difficultly accessible: by the treatment with ketones, such as acetone, they decompose into powder.

For the manufacture of footwear the foils of polyvinyl chloride will have a great importance which is entirely different from that of artificial leather and of rubber hitherto applied. In contrast to these materials the artificial leathers of porous polyvinyl chloride let the transpiration pass through and are much more like real leather because they are able to take up some moisture and can easily give it off. These advantages and the resistance to aging and the strength make the foils, furs, and skins of porous polyvinyl chloride superior to all other materials, if leather, especially deerskin is to be replaced by an artificial material.

Saddles, especially those for bicycles, may be produced of the porous and elastic polyvinyl chloride compositions. Thus foils of porous polyvinyl chlorides are also very much suitable for elastic supports of tents protecting against moisture and the cold of the soil. Especially foils containing tricresylphosphate as plasticizers have only a slight permeability for water in spite of their porosity. They can be made completely impermeable to water if benzine containing oil is pressed or sucked through them. Upholstery, coverings for chairs, sofas and furniture, and the like can advantageously be produced of the new artificial materials. Especially flocks, splinters and wools of porous polyvinyl chlorides are an excellent material for upholstery which will not age. All these advantages can also usefully be applied for the production of articles such as handbags, writing-supports, and the like.

It may also be mentioned that leather grains or another plastic design may be obtained if porous foils are produced by sintering between two heating plates which are suitably engraved. Occasionally the possibility to spread the porous coverings in situ can also be important for the production of saddlers', harness-makers', and pouch and purse makers' wares.

The porous foils of polyvinyl chloride present new and progressive printing cloths and coatings for printing rollers. Beside their favorable mechanical properties, their durability and the ability to be cleaned easily and thoroughly they are also able to take up the printing colors very well on account of their absorbing properties, and are thus an excellent reserve of colors.

On account of their suitability for strongly absorbed impregnations and the possibility that they can be produced in situ, coatings of porous polyvinyl chloride are also very suitable for the protection of ship walls against sea animals and sea plants. The porous structure causes the animals and plants to be poisoned much more effectively when they enter the pores containing poison than by the hitherto applied non-porous poison coatings which lose their content of poison at the surface relatively quickly. In spite of their porosity the coatings of polyvinyl chloride compositions can be obtained with an outward smoothness sufficient also for these purposes.

The ability to impregnate foils or coatings of porous polyvinyl chloride with strongly adhering poisons and if necessary to impregnate them with glue or other solutions of adhesive substance makes them also suitable as means for the extermination of animals and plants such as bandages for trees.

By their resistance to putrefaction and aging in connection with the good insulating properties the porous flocks, splinters, and wools can also be applied for the agricultural covering of the soil.

By all the described properties, especially because they easily and thoroughly can be sterilized and cleaned, the porous polyvinyl chlorides are appropriate for hygienic, orthopedic, therapeutic, and other medical applications.

Coarse porous molded articles of polyvinyl chloride can excellently be applied for bath sponges, rubber gloves, and the like, thin splitted foils can be used for the production of mouthpieces for cigarettes, nicotine filters for pipes, smoke consumers, foils which have to absorb perspiration, absorbent arch supports for shoes, protecting stockings which do not hinder the transpiration, for people with varicose veins, and other bandages. The foils which are porous on the upper side and nonporous on the under side are especially suited for baby supports which can well be boiled and sterilized.

For orthopedic applications the suitable regulation of the elasticity and porosity is highly important. Orthopedic arch-supports, linings for corsets and in protheses, pressure balls for trusses and the like can better be produced of the new artificial materials and with a better suitability to the inquirements of every particular case.

For therapeutic applications the porous polyvinyl chlorides present important advantages by their compatibility with the various disinfectants and medicaments and by their excellent capability of absorbing if they are sufficient microporous. They can be applied as active fillers in poultices under stiffening bandages, pessaries, tampons, and the like. Their properties permit their use with medicinal deposits to be introduced into the tissue or in wounds or cavities of the body. Thereby it is also important that they can be brought to an absolute sterile state by simplest means. Foils produced with tricresylphosphate as plasticizers and fillers of microporous polyvinyl chloride have a permanent antiseptic effect by themselves.

The new products of porous polyvinyl chloride can also be applied for other medical and especially for surgical purposes. The application for sick-supports, especially for operation-supports which are absorbing on the upper side and impermeable on the under side and which can easily be sterilized after being used, is obvious. On account of their absolute indifference to all liquids of the body in connection with their absolute sterilizability and their capability of absorbing therapeutic active substances of every kind they may be applied instead of the hitherto applied medicinal pads and plastic fillings to be laid in.

Their capability of absorbing which may be increased further by suitable impregnations makes foils of microporous polyvinyl chlorides also suitable artificial material for gas masks.

It is to be understood that the invention is not restricted to the particular embodiments thereof described hereinabove, but embraces all such modifications, variations and equivalents as fall within the scope of the appended claims.

The invention claimed is:

1. The process for producing porous polyvinyl chloride articles which comprises mixing particles of polyvinyl chloride with about 40 to 100% of its weight of a plasticizer which tends to dissolve polyvinyl chloride at elevated temperatures, the temperature of said mixing being sufficiently low to prevent substantial solution of said particles to form a pulverulent to granular mass of substantially non-adherent particles, and then heating the resulting mixture without further mixing to a temperature sufficiently elevated to cause sintering of said particles without complete coalescence thereof so as to form a porous article having substantially uniform porosity.

2. The process according to claim 1 in which said mixture is heated in a mold.

3. The process for producing porous polyvinyl chloride articles which comprises mixing particles of a high molecular weight polyvinyl chloride with about 40 to 100% of its weight of tricresylphosphate at a temperature sufficiently low to prevent substantial solution of said particles in the tricresylphosphate to form a pulverulent to granular mass of substantially nonadherent particles, and then heating the resulting mixture without further mixing to a temperature sufficiently elevated to cause sintering of said particles without complete coalescence thereof so as to form a porous article having substantially uniform porosity.

4. The process of claim 3 in which about equal parts by weight of the polyvinyl chloride and the tricresylphosphate are mixed at about 100° C. and the particles are sintered by heating to about 170° C.

HERBERT BERG.
MARTIN DORIAT.